(12) United States Patent
Ogawa et al.

(10) Patent No.: US 11,675,545 B2
(45) Date of Patent: Jun. 13, 2023

(54) DISTRIBUTED STORAGE SYSTEM AND STORAGE CONTROL METHOD

(71) Applicant: Hitachi, Ltd., Tokyo (JP)

(72) Inventors: Shugo Ogawa, Tokyo (JP); Akira Yamamoto, Tokyo (JP); Yoshinori Ohira, Tokyo (JP); Ryosuke Tatsumi, Tokyo (JP); Junji Ogawa, Tokyo (JP); Hiroto Ebara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 17/474,562

(22) Filed: Sep. 14, 2021

(65) Prior Publication Data

US 2022/0334726 A1 Oct. 20, 2022

(30) Foreign Application Priority Data

Apr. 14, 2021 (JP) .............................. JP2021-068624

(51) Int. Cl.
*G06F 3/00* (2006.01)
*G06F 3/06* (2006.01)

(52) U.S. Cl.
CPC ............ *G06F 3/067* (2013.01); *G06F 3/0604* (2013.01); *G06F 3/0647* (2013.01); *G06F 3/0655* (2013.01)

(58) Field of Classification Search
CPC ...... G06F 3/067; G06F 3/0604; G06F 3/0647; G06F 3/0655
See application file for complete search history.

(56) References Cited

U.S. PATENT DOCUMENTS

| | | | | |
|---|---|---|---|---|
| 5,574,952 A | * | 11/1996 | Brady | G06F 3/0601 341/95 |
| 2004/0088483 A1 | * | 5/2004 | Chatterjee | G06F 3/0689 714/E11.034 |
| 2008/0147934 A1 | * | 6/2008 | Nonaka | G06F 3/067 710/74 |
| 2011/0252216 A1 | * | 10/2011 | Ylonen | G06F 9/52 711/170 |
| 2012/0144110 A1 | * | 6/2012 | Smith | G06F 3/0607 711/E12.001 |
| 2018/0285016 A1 | | 10/2018 | Akutsu et al. | |

FOREIGN PATENT DOCUMENTS

WO   WO 2018/029820 A1   2/2018

\* cited by examiner

*Primary Examiner* — Craig S Goldschmidt
(74) *Attorney, Agent, or Firm* — Baker Botts L.L.P.

(57) ABSTRACT

One or a plurality of physical storage devices that provide a physical storage area are connected to first and second computers. The computer updates metadata indicating the address correspondence relationship between the logical address of the volume and the physical address of the physical storage area in the write processing performed based on a write request designating the volume. The first computer copies the metadata to the second computer while receiving the write request. When the address correspondence relationship indicated by the copied metadata portion is changed during copying of the metadata, the first computer updates the metadata portion and copies the metadata portion to the second computer.

7 Claims, 10 Drawing Sheets

DISTRIBUTED STORAGE SYSTEM AND STORAGE CONTROL METHOD

BACKGROUND OF THE INVENTION

1. Field of the Invention

The present invention generally relates to storage control of a distributed storage system.

2. Description of the Related Art

In a storage system that requires high processing performance for access (input/output (I/O)), performance can be improved by distributing processing to a plurality of controllers (a plurality of computers). In such a storage system, it is preferable to equalize loads between controllers in order to improve performance of access processing, and to prevent unevenness of loads on specific controllers. In addition, it is preferable to reduce overhead by eliminating communication between controllers as much as possible and completing access processing (write processing or read processing) in each controller.

Therefore, in a storage system having a plurality of controllers, it is conceivable to first allocate an access processing to each controller in a volume unit (an example of a unit independent from each other between controllers). A volume is a logical address space and is recognized as a device independent of an access source (typically, a host). The access processing for the volume is completed in the controller to which the access processing is allocated. Therefore, by allocating the controller that performs the access processing for each volume according to the load, it is possible to reduce the inter-controller communication that causes the overhead of the access processing while preventing the deviation of the load between the controllers.

In addition, in a case where the load of the access processing for each controller fluctuates with a change in the access state with respect to the volume and the deviation occurs, it is necessary to eliminate the deviation of the load by migrating the volume (specifically, volume access processing) between the controllers. In order to migrate the volume, it is necessary to copy metadata required for an access processing of the volume from the controller of the migration source to the controller of the migration destination. As the metadata to be copied between the controllers, for example, there is data indicating a correspondence relationship between the logical address of the volume and the physical address of the physical storage area. WO 2018/29820 discloses a technique for migrating an application and data used by the application to another server by copying data.

SUMMARY OF THE INVENTION

A storage system that dynamically allocates a storage area (physical address) at the time of storing data, for example, a storage system having a function such as thin provisioning is known. In such a storage system, an address correspondence relationship between a logical address of a volume and a physical address of a physical storage area is changed as data is stored in the volume, and therefore metadata changes. Therefore, when the volume is migrated between the controllers without stopping the access from the host, in order to prevent the address correspondence relationship from being updated during the copy, it is necessary to temporarily stop the access processing of the volume in the controller serving as the migration source and to switch between the copy of the metadata and the controller controlling the volume. The host waits until the controller of the volume migration destination resumes the access processing. Therefore, it is required to perform copy of metadata and switching of a controller that controls a volume in a short time before an access request from the host times out so that an abnormality does not occur in the host.

Meanwhile, a storage system having a data compression function is also known. When the compression function is applied to the data of the volume, the compression rate changes depending on the content of the data, and thus, the storage capacity required for storage changes for each data update even when the capacity of the data does not change. Therefore, when the compression function is used, it is preferable to store data in a format capable of efficiently storing data having a variable capacity, for example, data in a log structure. When the data is stored in the log structure, the storage area of the storage destination is dynamically arranged so as to be a continuous physical address on the physical storage area with respect to the data stored from the host. Therefore, it is necessary to manage the physical address for each fragment of the stored data.

Therefore, in order to store data in the log structure, it is necessary to manage data arrangement in a smaller unit as compared with management of arrangement such as data storage according to thin provisioning. In thin provisioning, an object is to improve utilization efficiency of a storage capacity by allocating a storage area from a physical storage area when data is stored for the first time in an area indicated by each logical address of a volume, and a size of the storage area can be larger than a unit size of a data access. On the other hand, in the data storage of the log structure, it is necessary to arrange the data stored from the host in a continuous area, and it is necessary to allocate the storage area (that is, the storage area is a unit size of the data access) in units equivalent to the capacity of the stored data.

In the storage system to which the compression function is applied, in order to cope with the variable capacity of data, it is necessary to manage the arrangement of data in a small unit as compared with a storage system to which the compression function is not applied. For example, in thin provisioning, in order to suppress an increase in arrangement management cost, it is possible to allocate a storage area to a volume in a unit (for example, a unit such as 1 GiB) larger than a general size of data to be stored at a time. On the other hand, in order to store data in a continuous area and efficiently use the capacity of the storage area, it is necessary to manage the data arrangement of the log structure in a unit equivalent to a write unit (access size at the time of data storage) such as 4 KiB, for example. In the case of this example, the capacity of metadata required to manage the data arrangement of the log structure is 1 GiB/4 KiB=262144 times, and the capacity of metadata required to access the volume is larger than the amount of metadata required to manage the data arrangement of thin provisioning.

That is, in the storage system to which the compression function is applied, since the capacity of the metadata to be copied between the controllers at the time of migrating the volume is large, the time required for copying the metadata between the controllers is long, and it is difficult to prevent the timeout of the access request in the host.

In addition, typically, the capacity of the metadata required for the access processing of the volume increases according to the capacity of the volume. For this reason, there may be a problem that it is difficult to prevent the occurrence of timeout in the host regardless of whether data writing in the log structure is adopted. In addition, a storage system of a Hyper Converged Infrastructure is known in which host applications and storage control software modules are deployed in the same computer node. Such a storage system may have a similar problem.

One or a plurality of physical storage devices providing a physical storage area (physical address space) is connected to a plurality of computers (a plurality of computers including first and second computers). The computer updates metadata indicating the address correspondence relationship between the logical address of the volume and the physical address of the physical storage area in the write processing performed based on a write request designating the volume. The first computer copies the metadata to the second computer while receiving the write request specifying the volume. When the address correspondence relationship (mapping) indicated by the copied metadata portion is changed in the first computer during the copying of the metadata, the first computer updates the metadata portion to the metadata portion indicating the changed address correspondence relationship, and copies the updated metadata portion to the second computer.

According to the present invention, it is possible to reduce the stop time of the access processing of the volume, thereby preventing the occurrence of the timeout of the access processing.

Objects, configurations, and effects besides the above description will be apparent through the explanation on the following embodiments.

DESCRIPTION OF THE PREFERRED EMBODIMENTS

Figure 1:
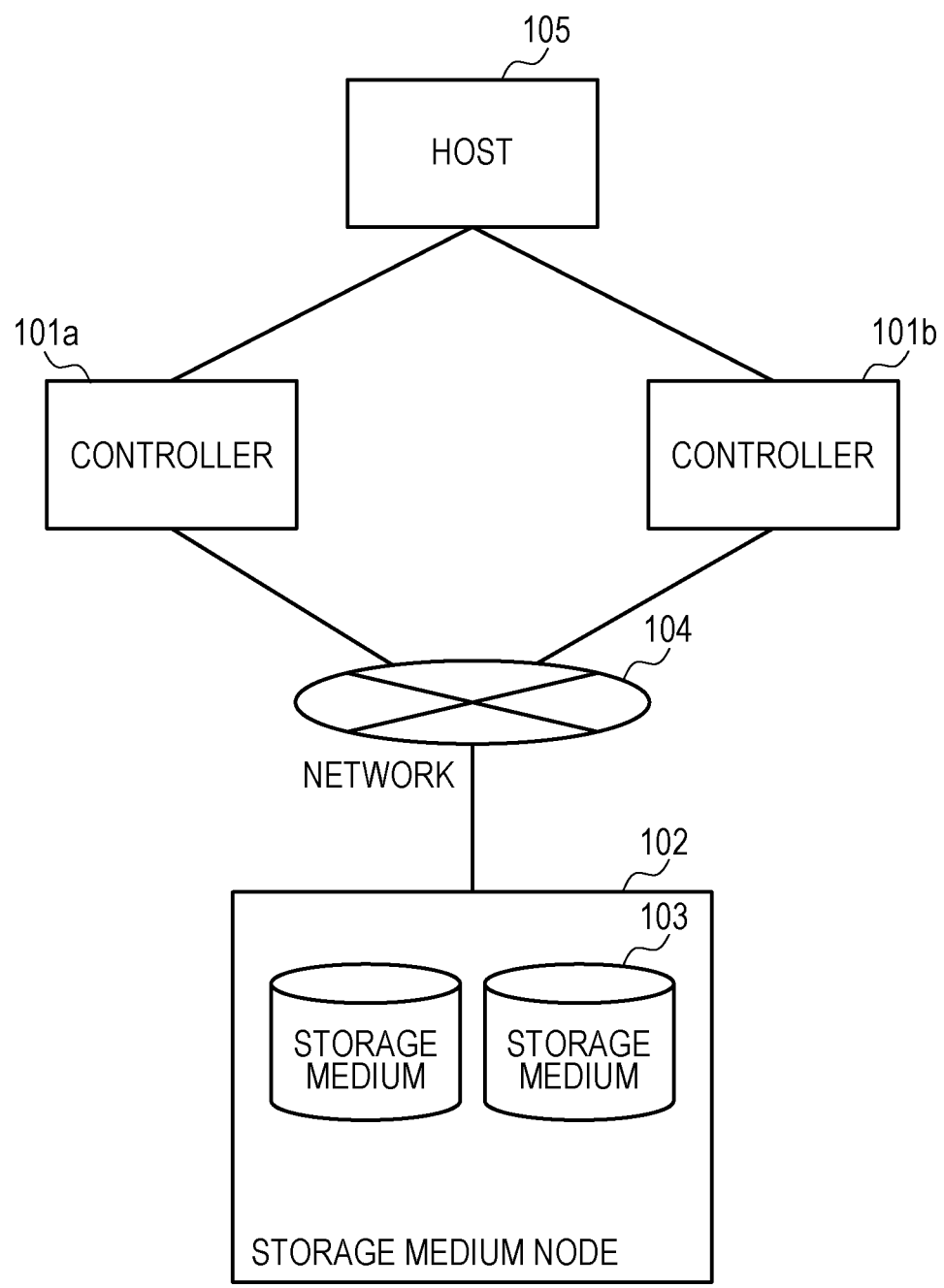
FIG. 1 is a diagram illustrating a configuration example of an entire system in a first embodiment.

In the following description, a "communication interface device" may represent one or more communication interface devices. The one or more communication interface devices may be one or more communication interface devices of the same type (for example, one or more Network Interface Cards (NICs)), or may be two or more communication interface devices of different types (for example, NIC and Host Bus Adapter (HBA)).

Further, in the following description, a "memory" is one or more memory devices that are examples of one or more storage devices, and may typically be a main memory device. At least one memory device in the memory may be a volatile memory device or a non-volatile memory device.

In the following description, a "storage unit" is an example of a unit including one or more physical storage devices. The physical storage device may be a persistent storage device. The persistent storage device may typically be a non-volatile storage device (for example, auxiliary storage device), and specifically, for example, a Hard Disk Drive (HDD), a Solid State Drive (SSD), a Non-Volatile Memory Express (NVMe) drive or a Storage Class Memory (SCM) may be used.

Further, in the following description, a "processor" may be one or more processor devices. At least one processor device is typically a microprocessor device such as a Central Processing Unit (CPU), or may be other types of processor devices such as a Graphics Processing Unit (GPU). At least one processor device may be configured by a single core, or multiple cores. At least one processor device may be a processor core. At least one processor device may be a processor device such as a hardware circuit (for example, Field-Programmable Gate Array (FPGA), Complex Programmable Logic Device (CPLD), or an Application Specific Integrated Circuit (ASIC)) which performs some or all of the processes in a broad sense.

In addition, in the following description, information from which an output is obtained with respect to an input will be described with an expression such as "mapping table", but the information may be data having any structure (for example, the data may be structured data or unstructured data). Therefore, for instance, the "mapping table" can be called "mapping information". In addition, in the following description, the configuration of each table is given as merely exemplary. One table may be divided into two or more tables, or all or some of two or more tables may be configured by one table.

In the following description, there is a case where processing is described with a "program" as a subject, but the subject of the processing may be a processor (alternatively, a device such as a controller having the processor) since the program is executed by the processor to perform defined processing appropriately using a memory and/or a communication interface device. The program may be installed on a device such as a computer from a program source. The program source may be, for example, a program distribution server or a computer-readable (for example, non-transitory) recording medium. In addition, in the following description, two or more programs may be expressed as one program, or one program may be expressed as two or more programs.

In addition, in the following description, in a case where similar types of elements are described without distinction, the common symbol among the reference symbols (or reference symbol) may be used. In a case where the similar elements are distinguished, the reference symbols of the elements (or the identifiers of the elements) may be used.

Hereinafter, some embodiments of the present invention will be described on the basis of the drawings. Note that the following embodiments do not limit the scope of the claims, and not all the elements described in the embodiments are necessary for solving the problems in the present invention.

First Embodiment

In the present embodiment, an example of a storage system that migrates volume access processing between controllers while avoiding the occurrence of timeout in an environment in which a plurality of controllers shares a storage medium will be described.

FIG. 1 is a diagram illustrating a configuration example of an entire system including a storage system according to a first embodiment and a host that makes an access request to the storage system.

The storage system includes two (or three or more) controllers 101a and 101b, and one (or a plurality of) storage medium node 102 connected to the controllers 101a and 101b via a network 104. The controllers 101a and 101b are connected to a host 105. The storage medium node 102 includes a plurality of (or one) storage media 103. Two (or three or more) controllers 101a and 101b are examples of a plurality of computers (for example, a plurality of computer nodes). The controller 101a is an example of a first computer. The controller 101b is an example of a second computer. One (or a plurality of) storage medium node 102 is an example of the storage unit. The storage medium 103 is an example of a physical storage device. Each controller 101 may be a general-purpose computer, and each general-purpose computer may execute predetermined software, so that a plurality of general-purpose computers may be constructed as a software-defined anything (SDx) system. Examples of the SDx may include a Software Defined Storage (SDS) or a Software-Defined Data Center (SDDC).

The controller 101 provides one (or a plurality of) volumes (logical address spaces) to the host 105. The controller 101 has a control right of a provided volume (an authority to control the volume or access the volume). The controller 101 performs access processing for the volume having the control right. That is, in the present embodiment, the access to the volume is provided by the controller 101 having the control right of the volume.

The storage medium node 102 is a device having a plurality of storage media 103. For example, the storage medium 103 may be a flash memory device that transmits and receives data according to a protocol called Non Volatile Memory Express over Fabric (NVMe-oF), and the storage medium node 102 may be a drive box type product called a Fabric-attached Bunch of Flash (FBOF) for the purpose of aggregating flash devices on a network. It is a matter of course that the storage medium 103 and the storage medium node 102 are not limited to such examples. The storage medium node 102 provides a physical storage area (physical address space) for the controller 101. The "physical storage area" mentioned herein may be, for example, an area including a storage area (storage medium area) for each storage medium 103. The controller 101 shares the storage medium 103 of the storage medium node 102, and any controller 101 can access the storage medium 103 without going through another controller 101. The storage medium 103 provides a storage area allocated to the volume constructed by the controller 101. The storage medium 103 is shared by the controllers 101a and 101b, and is accessed via the network 104.

The network 104 connects the controllers 101a and 101b and the storage medium node 102 to each other. Communication between the controllers 101 and access (reading or writing of data) from the controller 101 to the storage medium 103 in the storage medium node 102 are performed via the network 104.

The host 105 transmits an access request specifying a volume provided by the controller 101. The host 105 may be a physical computer or a virtual computer.

In addition to the controllers 101a and 101b, an additional controller 101 may be connected to the network 104, and a plurality of controllers 101 including the additional controller 101 may share the storage medium 103 of the storage medium node 102. The storage medium node 102 may also provide access to the plurality of storage media 103 at the same time. In addition, the connection to the network 104 is not limited to the example illustrated in FIG. 1, and for example, the host 105 may be connected to the network 104, and an access request may be transmitted from the host 105 to the controller 101a or 101b via the network 104.

Figure 2:
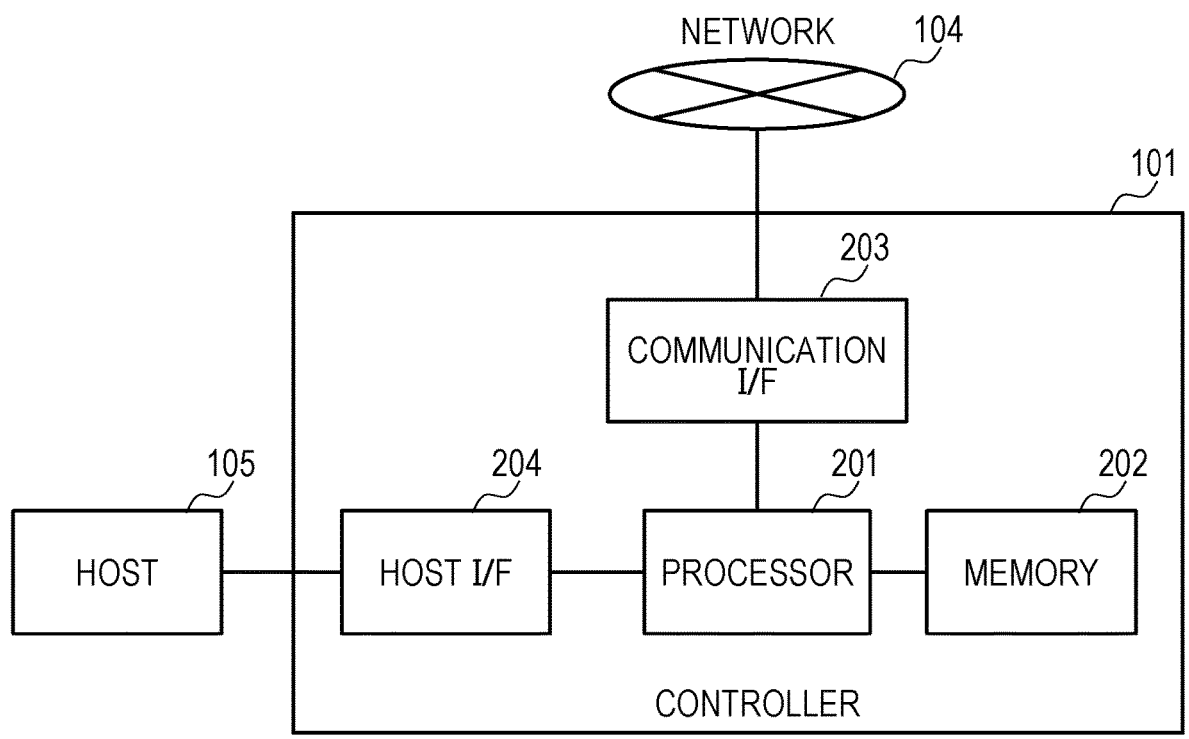
FIG. 2 is a diagram illustrating a configuration example of a controller in the first embodiment.

FIG. 2 is a diagram illustrating a configuration example of the controller 101. The controllers 101a and 101b have the same configuration.

The controller 101 includes a memory 202, a communication I/F 203, a host I/F 204, and a processor 201 connected thereto. The communication I/F 203 and the host I/F 204 are an example of a communication interface device.

The processor 201 reads and executes a program from the memory 202 and provides a volume to the host 105.

The memory 202 stores a program that operates on the processor 201, metadata used by the program, and data that needs to be temporarily stored.

The communication I/F 203 is connected to the network 104, and transmits an access request to the storage medium 103 of the storage medium node 102, receives a response, and transfers I/O data (data to be written or data to be read) accompanying processing of the access request.

A communication standard in connection between the communication I/F 203 and the network 104 is not particularly limited as long as an access request, transmission and reception of a response, and data transfer are possible. In addition, protocols used for transmission and reception of access requests, responses, and data performed between the controller 101a or 101b and the storage medium node 102 are not similarly limited.

The host I/F 204 receives an access request (an access request for a volume) from the host 105, transmits a response, and transfers I/O data with the host 105 in association with processing of the access request.

A communication standard and a protocol in connection between the controller 101a or 101b and the host 105 via the host I/F 204 are not particularly limited as long as transmission and reception of the access request and the response and data transfer are possible. When the host 105 is connected to the network 104, the host I/F 204 may use a configuration common to the communication I/F 203.

Figure 3:
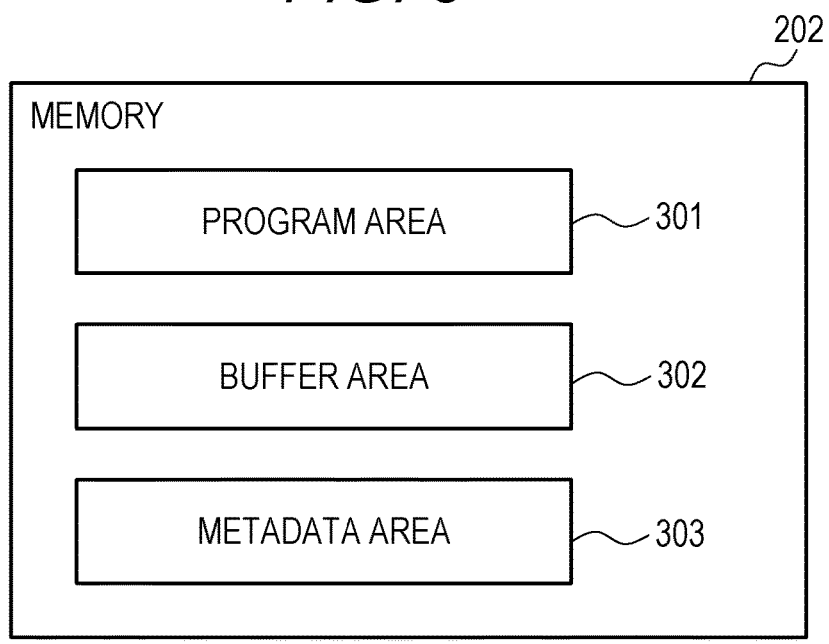
FIG. 3 is a diagram illustrating a configuration example of a memory in the first embodiment.

FIG. 3 is a diagram illustrating a configuration example of the memory 202.

The memory 202 includes a program area 301, a buffer area 302, and a metadata area 303.

The program area 301 stores a program (and other programs) that is executed by the processor 201 and implements a controller function of the storage system.

The buffer area 302 temporarily stores data read from the storage medium 103 in the storage medium node 102 (data to be read) or data to be written to the storage medium 103 (data to be written). Since the area 302 is a buffer, data read from the area 302 may be deleted from the area 302. The area 302 may be a cache area in which data remains in the area 302 even when the data is read from the area 302.

In the metadata area 303, metadata regarding the volume is stored for each volume provided by the controller 101 to the host 105.

Figure 4:
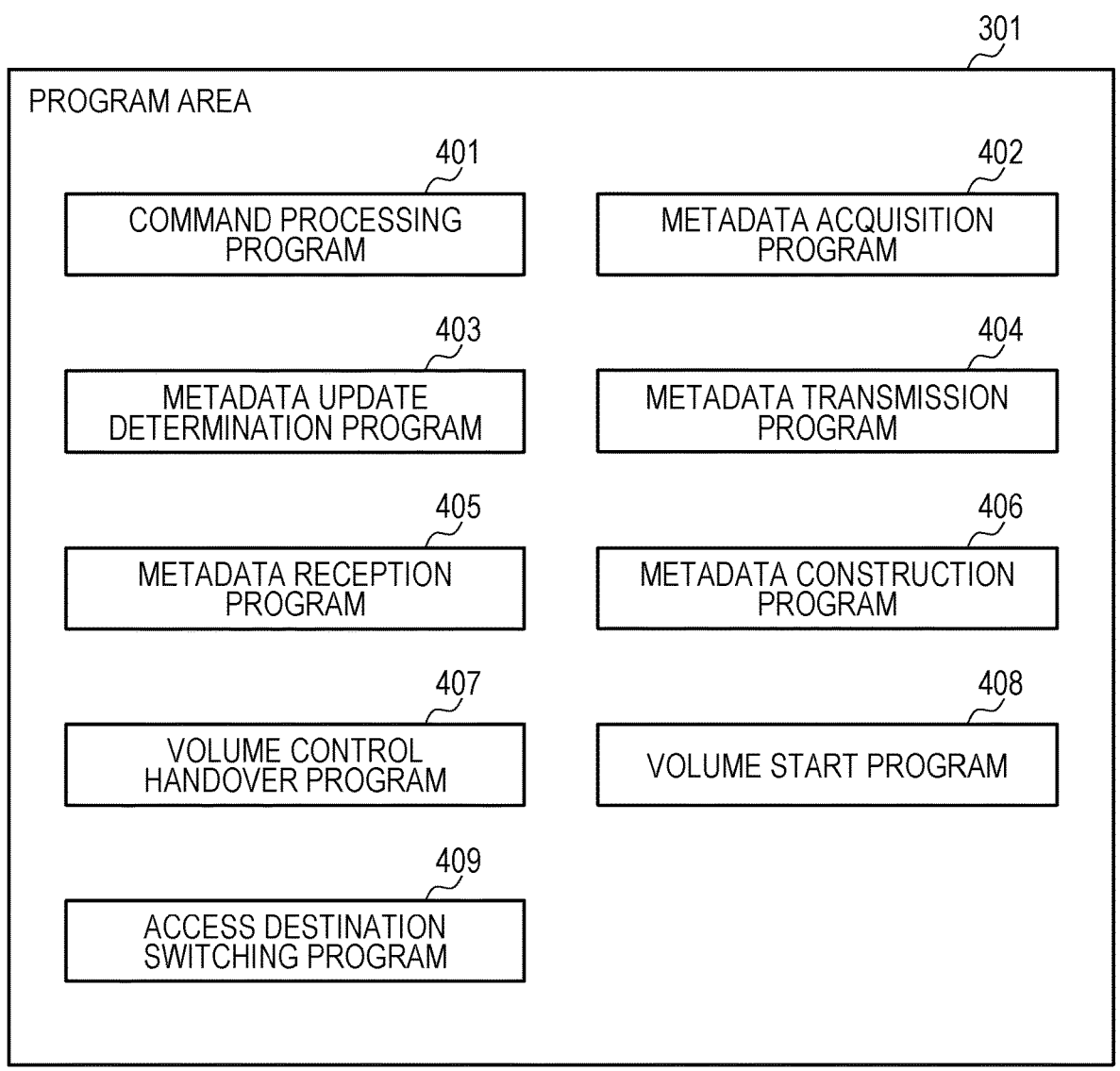
FIG. 4 is a diagram illustrating an example of a program stored in a program area in the first embodiment.

FIG. 4 is a diagram illustrating an example of a program stored in the program area 301.

The program area 301 stores a command processing program 401, a metadata acquisition program 402, a metadata update determination program 403, a metadata transmission program 404, a metadata reception program 405, a metadata construction program 406, a volume control handover program 407, a volume start program 408, and an access destination switching program 409.

The command processing program 401 receives an access request (an access request specifying a volume) from the host 105 via the host I/F 204 and responds to a result. In addition, the command processing program 401 starts processing corresponding to the access request, and executes the access request to the storage medium 103 included in the storage medium node 102 via the communication I/F 203. The protocol used in the access to the storage medium 103 is not particularly limited as long as the specified address can be accessed. Then, data corresponding to the access request is transferred to and from the host 105 via the host I/F 204.

The metadata acquisition program 402 reads the untransferred metadata portion (for example, an entry of a table (record)) from the metadata area 303 to the controller of the migration destination, and passes the metadata portion to the metadata transmission program 404.

The metadata update determination program 403 receives the update content of the metadata portion accompanying the access processing of the command processing program 401, and checks whether the acquisition of the metadata portion has already been completed. When the acquisition of the metadata portion is completed, the metadata update determination program 403 passes the update content of the metadata portion received from the command processing program 401 to the metadata transmission program 404.

The metadata transmission program 404 transmits the metadata portion received from the metadata acquisition program 402 or the metadata update determination program 403 to the controller of the volume migration destination via the communication I/F 203.

The metadata reception program 405 receives the metadata portion transmitted from the metadata transmission program 404 operating on the controller of the volume migration source, and passes the metadata portion to the metadata construction program 406.

The metadata construction program 406 receives the metadata portion of the migrating volume from the metadata reception program 405, and stores the metadata portion in the metadata area 303. Since all the metadata portions of the migration target volume are stored in the metadata area 303, a mapping table to be described later as metadata corresponding to the migration target volume is copied to the controller of the migration destination. In addition, the metadata construction program 406 generates data (that is, mapping indicating the logical address of the migration target volume from the storage area of the storage medium 103) indicating an address direction (physical address→logical address) opposite to the address direction (logical address→physical address) indicated by the metadata portion received from the metadata reception program 405, and registers the data in a reverse lookup table to be described later in the metadata area 303.

The volume control handover program 407 stops the access processing in the controller of the volume migration source and instructs the controller of the migration destination to start the access processing of the volume. In addition, the volume control handover program 407 deletes the mapping table and the reverse lookup table (the mapping table and the reverse lookup table corresponding to the migration target volume) to be described later in the controller of the migration source after the start instruction of the volume access processing to the controller of the migration destination.

In the controller of the volume migration destination, the volume start program 408 receives the start instruction of the access processing from the controller of the migration source, and starts the access processing using the mapping table (and the reverse lookup table) constructed by the metadata construction program 406. In addition, the volume start program 408 instructs the access destination switching program 409 to change the controller of the transmission destination of the access request designating the migration target volume to the host 105.

In response to the instruction from the volume start program 408 in the controller of the volume migration destination, the access destination switching program 409 notifies the host 105 of a change in the controller of the transmission destination of the access request designating the volume (and the changed transmission destination controller). The access destination switching program 409 can also operate in the controller of the volume migration source. In this case, an instruction (instruction to the host 105 to change transmission destination controller of the access request designating the migration target volume) is received from the volume control handover program 407 after the shifting of the volume access processing, and a notification (notification of a change of the transmission destination controller of the access request in which the volume is designated (and transmission destination controller after change)) is sent to the host 105 in response to the instruction.

Figure 5:
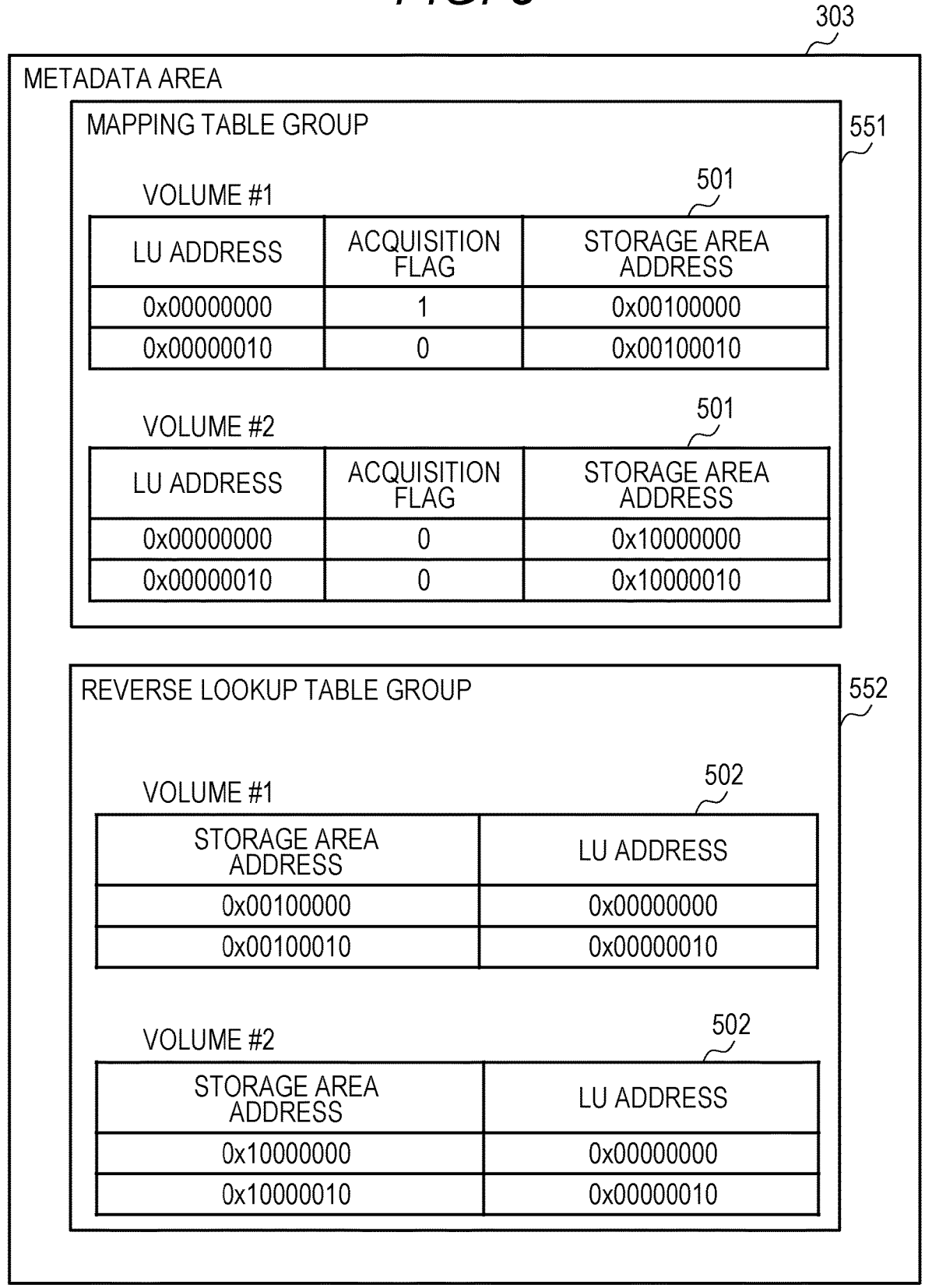
FIG. 5 is a diagram illustrating an example of metadata stored in a metadata area in the first embodiment.

FIG. 5 is a diagram illustrating an example of metadata stored in the metadata area 303.

In the metadata area 303, a mapping table group 551 including a mapping table 501 for each volume and a reverse lookup table group 552 including a reverse lookup table 502 for each volume are stored.

For each volume, the mapping table 501 indicates a correspondence relationship between the logical address (volume address) of the volume and the physical address (storage area address) of the physical storage area. Each entry constituting the mapping table 501 represents one volume address and one storage area address allocated to the one volume address. That is, the address direction indicated by each entry is volume address→storage area address. In addition, each entry constituting the mapping table 501 has an acquisition flag indicating whether the entry has been acquired as a metadata portion to be transferred to the controller of the volume migration destination corresponding to the mapping table 501. The acquisition flag is "0" (not acquired) in an initial state in which each entry is generated. The value indicating whether the entry has been acquired may be a value other than "0" (not acquired) and "1" (acquired).

For each volume, the reverse lookup table 502 represents a correspondence relationship between a storage area address and a volume address. Each entry constituting the reverse lookup table 502 represents one storage area address and one volume address of an allocation destination of the one storage area address. That is, the address direction indicated by each entry is storage area address→volume address. For each volume, the reverse lookup table 502 is referred to for garbage collection as an example of processing (background processing) performed regardless of whether an access request designating the volume is received.

Hereinafter, an example of processing performed in the present embodiment will be described. In the following description, the controller of the migration source is referred to as "controller 101a", the controller of the migration destination is referred to as "controller 101b", and the migration target volume from the controller 101a to the controller 101b is referred to as "volume #1".

Figure 6:
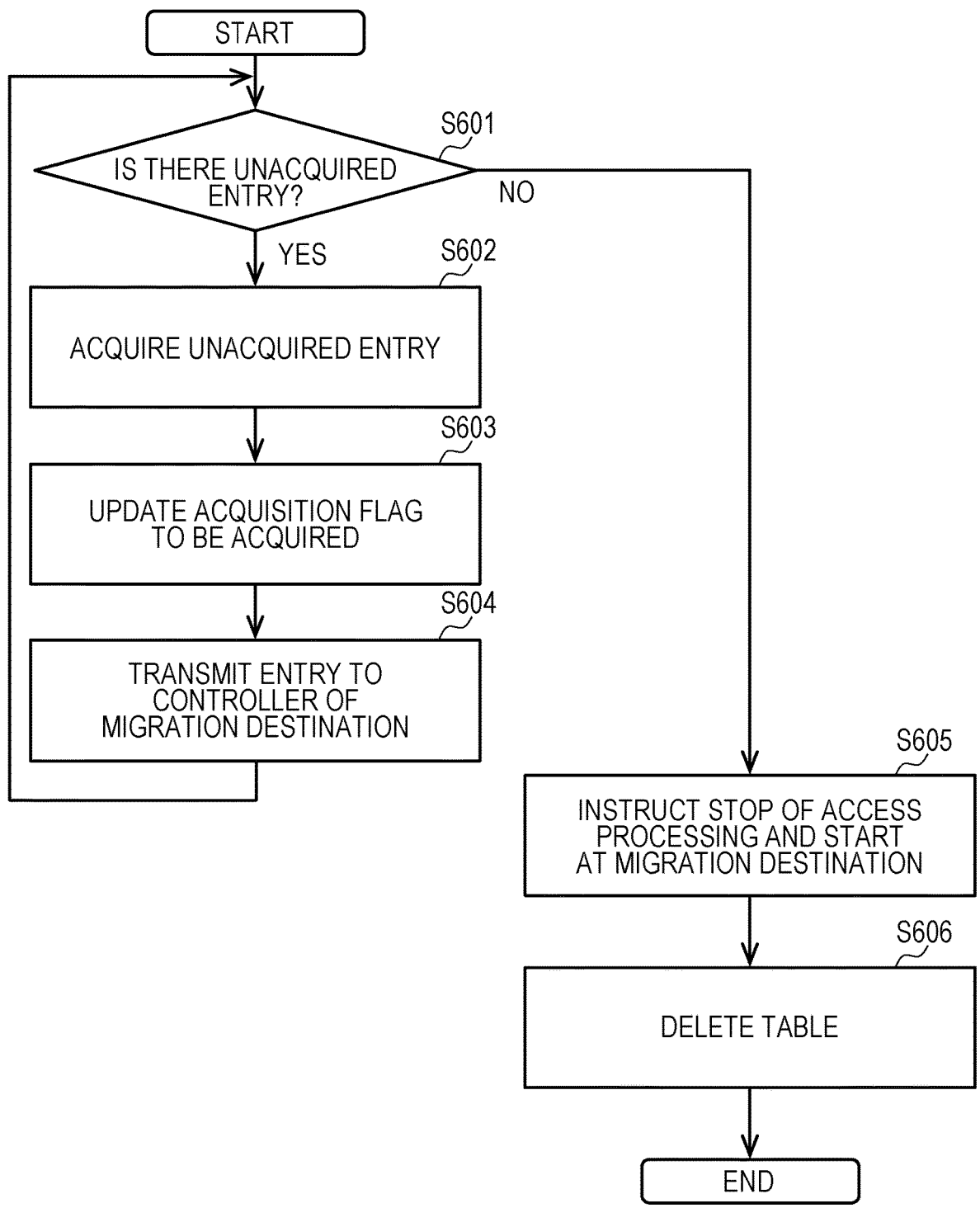
FIG. 6 is a flowchart illustrating a flow of volume migration processing performed by a controller of a migration source in the first embodiment.

FIG. 6 is a flowchart illustrating a flow of volume migration processing performed by the controller 101a when the volume #1 is migrated from the controller 101a to the controller 101b. This processing may be performed, for example, in any of the following cases. When this processing is started, a migration instruction, which is an instruction to migrate the volume #1 to the controller 101b, is input from the command processing program 401 (or another program) to the metadata acquisition program 402.

A case where the controller 101a receives the migration instruction to migrate the volume #1 to the controller 101b from the host 105 (or a console (not illustrated)).

A case where it is detected that the controller 101a has a relatively high load and the volume #1 is determined as the migration target volume.

S601: When receiving the migration instruction to migrate the volume #1 to the controller 101b, the metadata acquisition program 402 notifies the controller 101b of the start of the process related to the migration of the volume #1, and determines whether there is an unacquired entry (entry having the acquisition flag "0") in the mapping table 501 corresponding to the volume #1. When there is an unacquired entry, the process proceeds to S602, and otherwise, the process proceeds to S605.

S602: The metadata acquisition program 402 acquires (reads) one unacquired entry from the mapping table 501 corresponding to the volume #1 from the mapping table 501 stored in the metadata area 303 of the memory 202, and stores the entry in the buffer area 302.

S603: The metadata acquisition program 402 updates the acquisition flag in the entry acquired in S602 in the mapping table 501 corresponding to the volume #1 to "1".

S604: The metadata transmission program 404 transmits the entry (metadata portion) stored in the buffer area 302 in S602 to the controller 101b via the network 104. Thereafter, the process returns to S601.

S605: The volume control handover program 407 stops the access processing of the volume #1 by the command processing program 401 (stops receiving the access request designating the volume #1), and instructs the controller 101b to start the access processing of the volume #1. "Stop the access processing of the volume #1" may be returning an error when an access request designating the volume #1 is received, or may be non-responding when an access request designating the volume #1 is received.

S606: The volume control handover program 407 deletes the mapping table 501 and the reverse lookup table 502 corresponding to the volume #1 from the metadata area 303.

Figure 7:
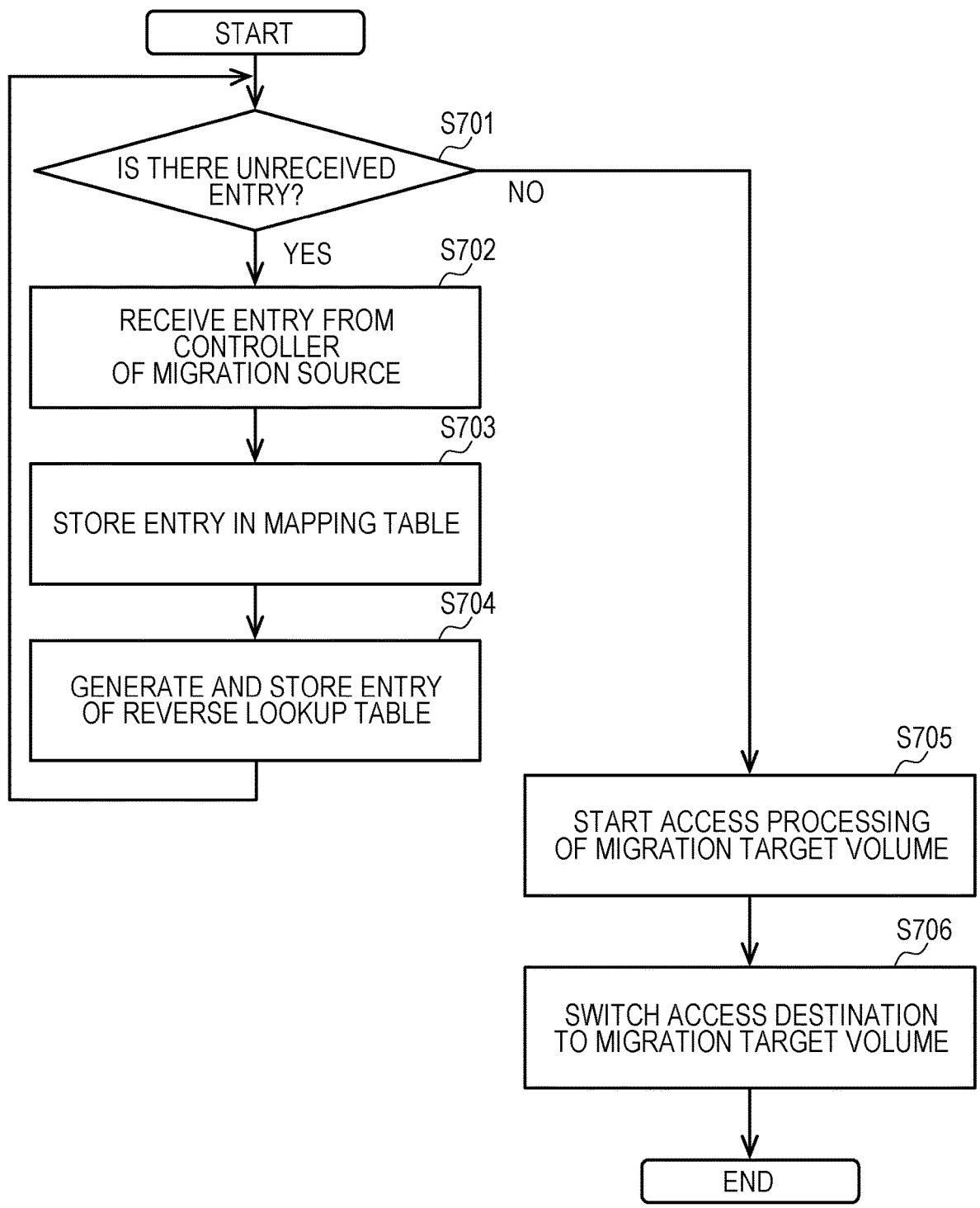
FIG. 7 is a flowchart illustrating a flow of volume migration processing performed by a controller of a migration destination in the first embodiment.

FIG. 7 is a flowchart illustrating a flow of volume migration processing performed by the controller 101b when the volume #1 is migrated from the controller 101a to the controller 101b.

S701: When receiving the notification of the start of the process related to the migration of the volume #1 from the controller 101a, the metadata reception program 405 determines whether an entry (metadata portion) to be received from the controller 101a as the migration source remains (in other words, whether an instruction to start the access processing of the volume #1 has been received). The process proceeds to S702 when there remains an unreceived entry, otherwise the process proceeds to S705.

S702: The metadata reception program 405 receives an entry in the mapping table 501 corresponding to the volume #1 from the controller 101a as the migration source (that is, the entry transmitted in S604 of FIG. 6 is received), and stores the entry in the buffer area 302.

S703: The metadata construction program 406 acquires the entry stored in S702 from the buffer area 302, and stores the entry in the metadata area 303 as the entry of the mapping table 501 corresponding to the volume #1.

S704: The metadata construction program 406 generates an entry in which the address direction indicated by the entry acquired in S703 is set to the reverse direction on the basis of the entry acquired in S703, and stores the entry in the metadata area 303 as an entry of the reverse lookup table 502 corresponding to the volume #1. Thereafter, the process returns to S701.

S705: In response to the start instruction (the start instruction of the access processing of the volume #1) received from the controller 101a, the volume start program 408 starts the access processing of the volume #1 constructed in the controller 101b based on the mapping table 501 corresponding to the volume #1. In the mapping table 501 corresponding to the volume #1 (the mapping table 501 copied from the controller 101a), the correspondence relationship between the volume address and the storage area address has already been recorded for the volume #1, and the data corresponding to each volume exists in the storage medium node 102 accessible from any of the controllers 101a and 101b via the network 104. Therefore, the access processing of the volume #1 can be started without the inter-volume copy (copy between the controllers 101) of the data stored in the volume.

S706: In response to the instruction accompanying the start of the access processing of the volume #1 from the volume start program 408, the access destination switching program 409 notifies the host 105 that the controller of the access request destination of the volume #1 has been changed to the controller 101b, that is, switches the access request destination of the host 105.

Figure 8:
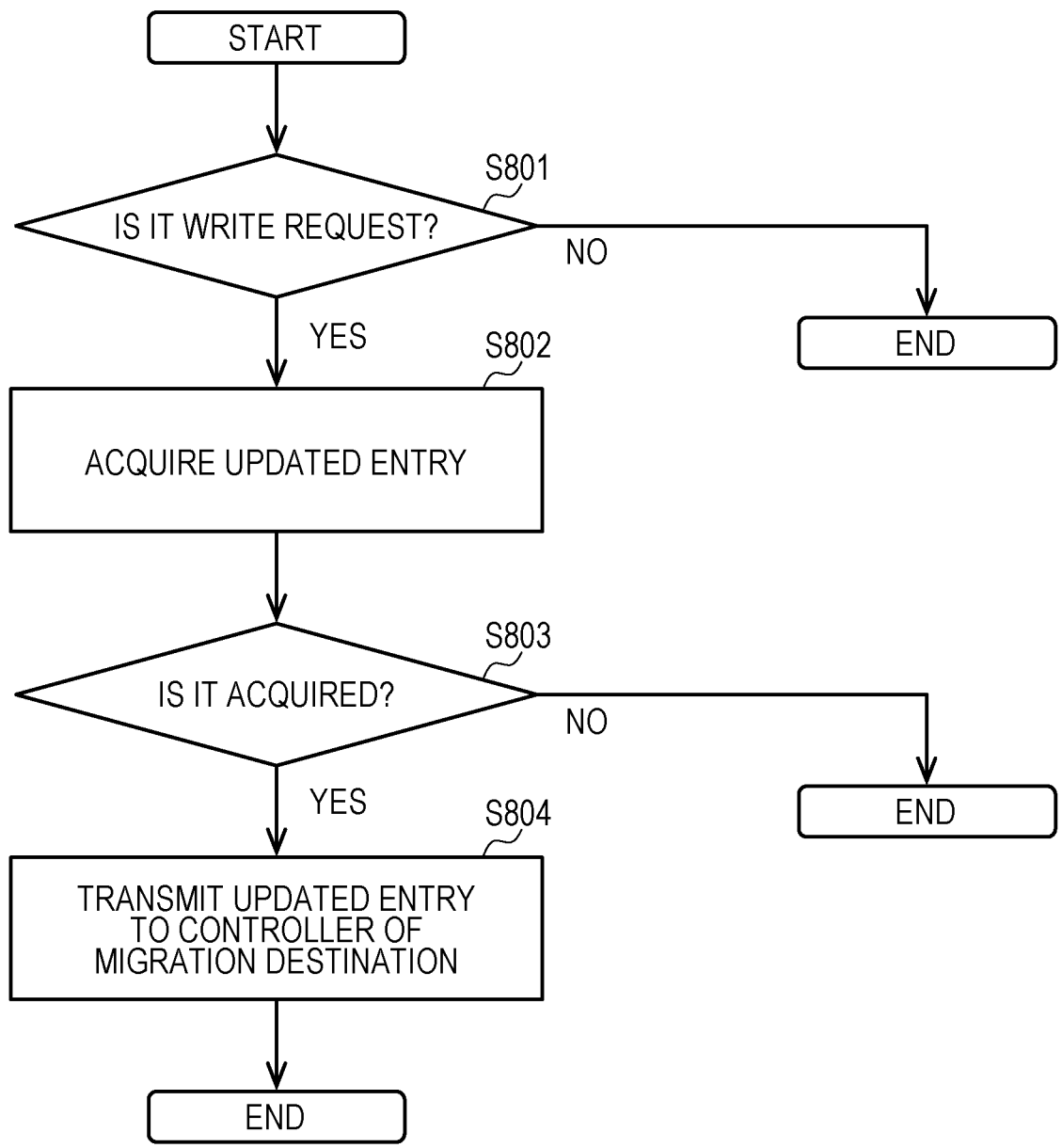
FIG. 8 is a flowchart illustrating a flow of processing performed by the controller of the migration source when the controller of the migration source receives an access request designating a migration target volume during metadata copy in the first embodiment.

FIG. 8 is a flowchart illustrating a flow of processing performed by the controller 101a when the controller 101a receives an access request designating the volume #1 from the host 105 while the controller 101a copies the mapping table 501 of the volume #1 to the controller 101b.

S801: The command processing program 401 determines whether the access request from the host 105 is a write request. When the access request is a write request, the process proceeds to S802. When the access request is a read request, the mapping table 501 is not updated, and thus the process ends.

S802: The command processing program 401 acquires an entry (an entry of the mapping table 501 corresponding to the volume #1) updated by the storage of data according to the write request of the host 105, and stores the entry in the buffer area 302.

S803: The metadata update determination program 403 determines whether the acquisition flag of the updated entry (the entry of the mapping table 501 corresponding to the volume #1) is "1" (acquired). When the acquisition flag is "1" (acquired), the process proceeds to S804. When the acquisition flag is "0" (not acquired), the process ends. This is because the entry is later transmitted (copied) to the controller 101*b* by S604 in FIG. 6.

S804: The metadata transmission program 404 transmits the entry (updated entry) stored in the buffer area 302 in S802 to the controller 101*b* via the network 104.

According to the present embodiment, in the storage system in which the controllers 101*a* and 101*b* share the storage medium 103, the access processing of the volume #1 can be shifted between the controllers 101 while the occurrence of timeout is avoided. By copying the metadata of the volume #1 (the mapping table 501 in the present embodiment) between the controllers 101 without stopping the access processing of the migration target volume #1, the time to stop the access processing of the volume #1 can be reduced (the time during which the access processing of the volume #1 stops can be set to a short time from when the controller 101*a* stops to when the controller 101*b* starts), and the timeout of the access request to the volume #1 of the host 105 can be avoided.

Second Embodiment

In the present embodiment, in a storage system in which the controllers 101*a* and 101*b* share the storage medium 103, an example of a storage system that performs exclusive control of access (specifically, writing) to the volume #1 when the mapping table 501 of the volume #1 is copied between the controllers 101 will be described. Note that, in the description of the present embodiment, differences from the first embodiment will be mainly described, reference numerals of components, and operations that are not described are the same as those of the first embodiment, and description thereof will be omitted or simplified.

Figure 9:
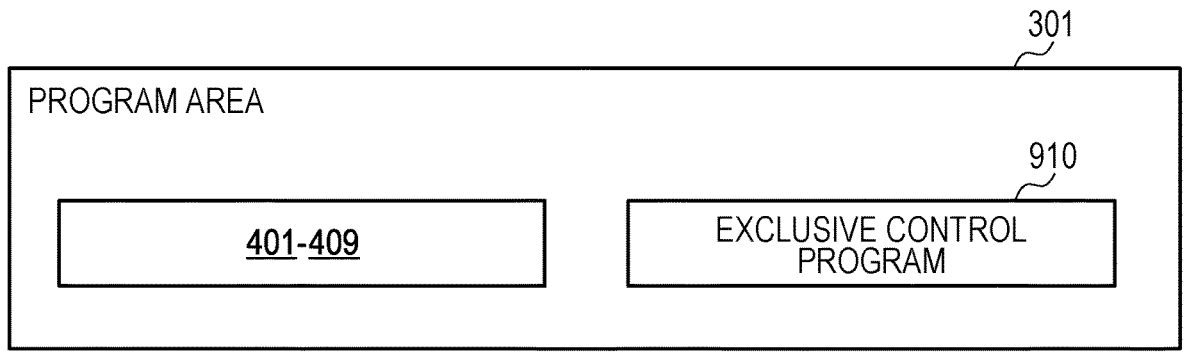
FIG. 9 is a diagram illustrating an example of a program stored in a program area in a second embodiment.

FIG. 9 is a diagram illustrating an example of a program stored in the program area 301 according to the second embodiment.

The program area 301 stores an exclusive control program 910 in addition to the programs 401 to 409 described in the first embodiment. The exclusive control program 910 compares the access destination volume address in the volume #1 with the volume address indicated by the acquisition target entry for the access request received by the command processing program 401 from the host 105 for the migration target volume #1 and the entry acquired by the metadata acquisition program 402 from the mapping table 501 of the volume #1, and performs the exclusive control so that the write request and the metadata acquisition for the same address of the volume #1 do not occur at the same time.

Figure 10:
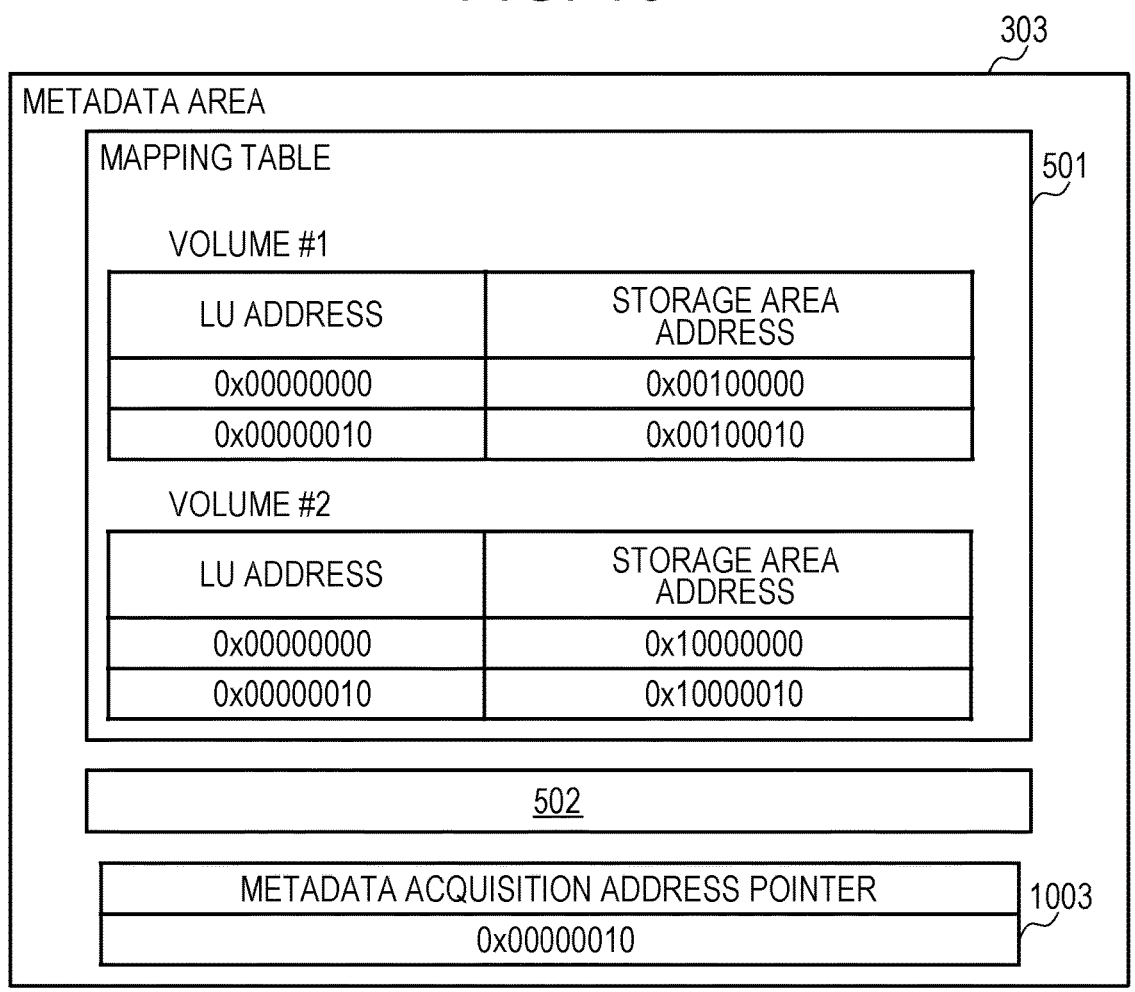
FIG. 10 is a diagram illustrating an example of metadata stored in a metadata area in the second embodiment.

FIG. 10 is a diagram illustrating an example of metadata stored in the metadata area 303 according to the second embodiment.

In the metadata area 303, a metadata acquisition address pointer 1003 is stored in addition to the mapping table 501 and the reverse lookup table 502 for each volume.

For each volume, the mapping table 501 does not require an acquisition flag unlike the first embodiment.

The metadata acquisition address pointer 1003 indicates an entry of the volume #1 of the mapping table 501 to be acquired next by the metadata acquisition program 402. The metadata acquisition address pointer 1003 is prepared for each migration target volume. In the example illustrated in FIG. 10, since the migration target volume is only the volume #1, the metadata acquisition address pointer 1003 corresponding to the volume #1 is illustrated. The metadata acquisition address pointer 1003 indicates the volume address of the volume #1. The metadata acquisition program 402 acquires entries (metadata portions) from the mapping table 501 of the volume #1 in ascending order of volume addresses (order from the head volume address). The entries in the mapping table 501 of the volume #1 may be acquired in descending order of the volume addresses or in another order having regularity with respect to the volume addresses.

Figure 11:
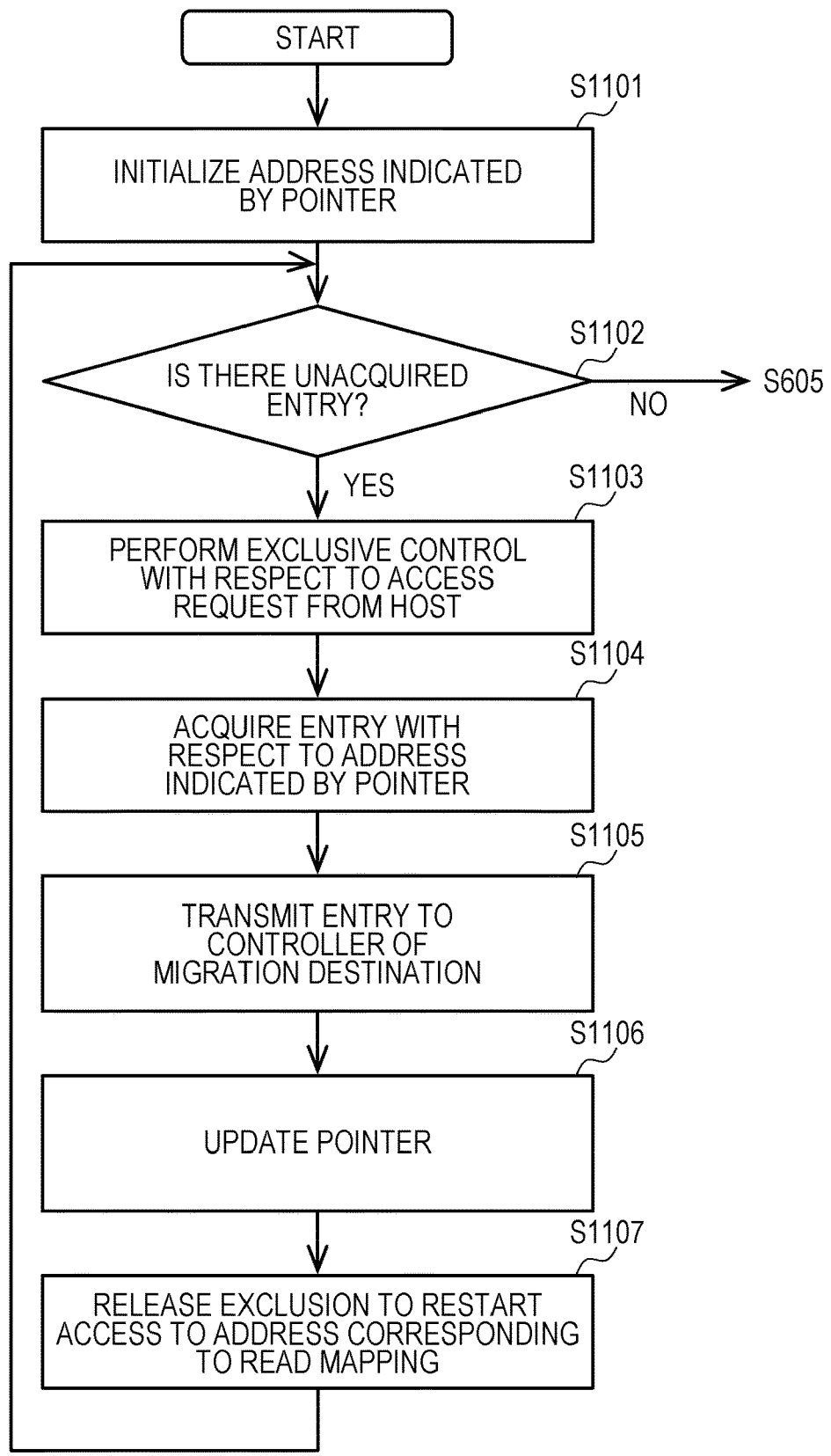
FIG. 11 is a part of a flowchart illustrating a flow of volume migration processing performed by a controller of a migration source in the second embodiment.

FIG. 11 is a part of a flowchart illustrating a flow of volume migration processing performed by the controller 101*a* when the volume #1 is migrated from the controller 101*a* to the controller 101*b* in the second embodiment.

S1101: When receiving the instruction to migrate the volume #1 to the controller 101*b*, the metadata acquisition program 402 initializes the volume address indicated by the metadata acquisition address pointer 1003 of the volume #1 to "0" (head volume address). In the present embodiment, since the entries are copied in ascending order of the volume addresses, the volume address recorded by the initialization is "0", but the volume address recorded by the initialization may be determined depending on the order of regularity with respect to the volume address.

S1102: The metadata acquisition program 402 determines whether the volume address pointed by the metadata acquisition address pointer 1003 of the volume #1 exceeds the value of the last volume address of the volume #1. If the volume address pointed by the metadata acquisition address pointer 1003 of the volume #1 is equal to or less than the volume address at the end of the volume #1, there is an unacquired entry, and thus the process proceeds to S1103. When the volume address pointed by the metadata acquisition address pointer 1003 of the volume #1 exceeds the volume address at the end of the volume #1, the process proceeds to S605 of FIG. 6 (that is, in this case, S605 and S606 are performed).

S1103: The metadata acquisition program 402 exclusively controls the exclusive control program 910 to acquire an entry and write from the host 105 for the volume address of the metadata acquisition address pointer 1003 of the volume #1. The exclusive control may be that exclusion (lock) is acquired for the volume address of the metadata acquisition address pointer 1003 of the volume #1. The exclusive control program 910 confirms the address of the write request being processed by the command processing program 401, and causes the processing of the metadata acquisition program 402 to stand by until completion of writing when writing is performed to the same address. After the completion of writing, the exclusion is acquired for the volume address of the metadata acquisition address pointer 1003 of the volume #1.

S1104: The metadata acquisition program 402 acquires an entry (that is, an unacquired entry) representing a volume address (a volume address for which exclusive control is performed) pointed by the metadata acquisition address pointer 1003 of the volume #1 from the mapping table 501 of the volume #1, and stores the entry in the buffer area 302.

S1105: The metadata transmission program 404 transmits the entry stored in the buffer area 302 in S1104 to the controller 101*b* via the network 104.

S1106: The metadata acquisition program 402 adds a value corresponding to the volume address indicated by the entry read in S1104 to the volume address (value) pointed by the metadata acquisition address pointer 1003 of the volume #1. The "value corresponding to the volume address indicated by the entry read in S1104" corresponds to the size of the volume area to which the volume address indicated by the entry belongs. For example, when the data storage in the log structure is adopted, the size of the volume area to which the volume address indicated by the entry belongs may be a write unit size. That is, a value to be added to the volume address pointed by the metadata acquisition address pointer 1003 may be determined in advance as a constant value for each volume address recorded in the entry. When thin provisioning is adopted, a value to be added to the volume address pointed by the metadata acquisition address pointer 1003 may be the size (unit size) of the storage area allocated to the volume #1 for each volume address recorded in the entry. In this manner, the size of the storage area allocated to the volume #1 may be fixed. When the size of the storage area allocated to the volume #1 is variable, a range (for example, a start volume address and the size, or the start volume address and an end volume address) of the volume address may be recorded as the volume address in the entry of the mapping table 501 of the volume #1.

S1107: The metadata acquisition program 402 causes the exclusive control program 910 to release the exclusion, thereby resuming the process for the write request from the host 105 with respect to the volume address indicated by the entry transmitted in S1106. Thereafter, the process returns to S1102.

Figure 12:
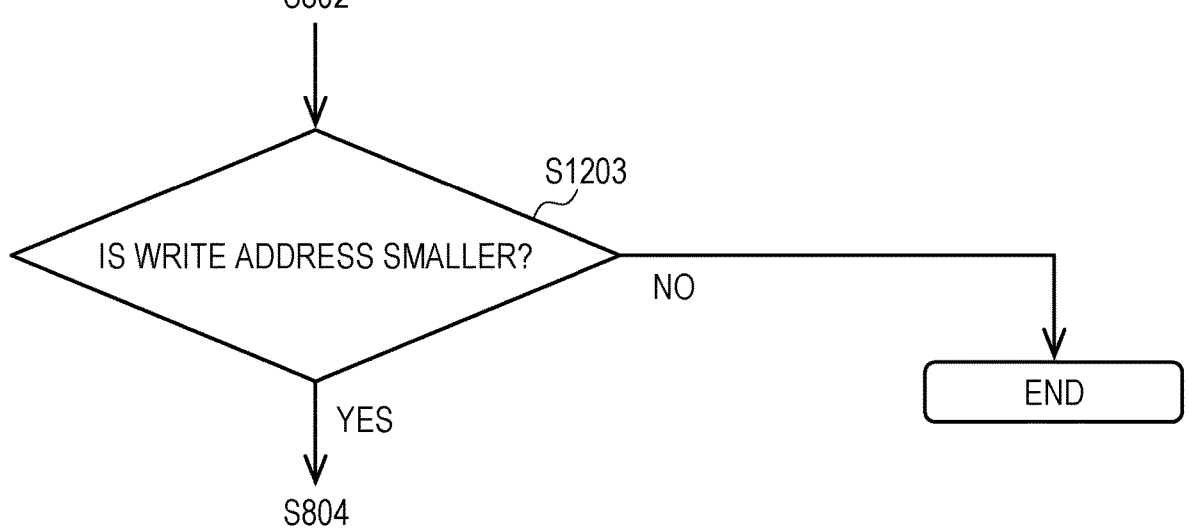
FIG. 12 is a part of a flowchart illustrating a flow of processing performed by the controller of the migration source when the controller of the migration source receives an access request designating a migration target volume during metadata copy in the second embodiment.

FIG. 12 is a part of a flowchart illustrating a flow of processing performed by the controller 101*a* when the controller 101*a* receives an access request designating the volume #1 from the host 105 during metadata copying according to the second embodiment. According to this flowchart, a difference from the flowchart illustrated in FIG. 8 is as follows.

After S802, S1203 is performed instead of S803. In S1203, the metadata update determination program 403 compares the volume address (hereinafter, pointer address) pointed by the metadata acquisition address pointer 1003 of the volume #1 with the volume address (hereinafter, write address) designated by the write request from the host 105, and determines whether the value of the write address is less than the value of the pointer address. When the value of the write address is less than the value of the pointer address, the process proceeds to S804 in FIG. 8. This is because the entry updated in S802 is a copied entry. When the value of the write address is equal to or larger than the value of the pointer address, the process ends.

According to the present embodiment, in a storage system in which the controllers 101*a* and 101*b* share the storage medium 103, when the mapping table 501 of the volume #1 is copied between the controllers 101, exclusive control with the processing of the write request with respect to the volume #1 is possible.

Note that the present invention is not limited to the above embodiments, and may include various derivative forms. For example, although each function of the controller 101 is realized by a program executed by the processor 201, some or all of the functions may be implemented by hardware. In addition, although the controllers 101*a* and 101*b* and the storage medium node 102 are connected to the network 104, they may be connected by the same housing, a bus in the same hardware, a backplane, or the like (for example, the storage medium 103 may not necessarily be within storage medium node 102). In addition, a part or all of the mapping table 501 or a part or all of the reverse lookup table 502 may be stored in the storage medium 103 in the storage medium node 102.

The above description can be summarized as follows, for example. The following summary includes matters not described above (for example, supplementary explanation or description of a modification).

One or more storage media 103 that provide a physical storage area are connected to the controllers 101*a* and 101*b*. The physical storage area may include a storage medium area for each storage medium 103. The controller 101*a* provides a volume #1 (an example of a volume). Each time the controller 101*a* receives a write request designating the volume #1, the controller performs write processing in response to the write request #1. The write processing includes allocating a storage area address not allocated to any volume address to a volume address specified from the write request, and writing data accompanying the write request to a storage area (for example, a part of the storage medium area) to which the allocated physical address belongs in the physical storage area. The allocating of the storage area address to the volume address for the volume #1 includes writing the storage area address to the mapping table 501 of the volume #1 included in the controller 101*a* for the volume address.

In order to prevent the occurrence of the timeout of the write request designating the volume #1 (an example of the volume), the mapping table 501 (an example of the metadata) of the volume #1 necessary for the access processing of the volume to the controller 101*b* is copied between the controllers 101 without stopping the access request designating the volume #1, so that the stop time of the access processing of the volume #1 is reduced. Specifically, the controller 101*a* copies (transfers) the mapping table 501 of the volume #1 to the controller 101*b*. The controller 101*b* constructs the volume #1 in the controller 101*b* based on the mapping table 501 from the controller 101*a*. After copying of all entries of the mapping table 501 to the controller 101*b* is completed, the controller 101*a* stops the access processing of the volume #1 (for example, receiving of a write request designating the volume #1), and thereafter, the controller 101*b* starts the access processing designating the volume #1.

In the first and second embodiments, the controller 101*a* may have the control right of the volume #1. The controller 101 having the control right of the volume #1 may perform an access processing for the volume #1. After all the entries of the mapping table 501 of the volume #1 are copied to the controller 101*b*, the controller 101*a* may hand over the control right (control) of the volume #1 to the controller 101*b*. In addition, at least one of the controllers 101*a* and 101*b* may change the access destination controller of the volume #1 to the host 105 to the controller 101*b* (for example, the access destination according to the path from the host 105 to the volume #1 is changed from the controller 101*a* to the controller 101*b*), and then the controller 101*b* may start the access processing of the volume #1. In this way, the access destination of the volume #1 can be appropriately switched to the host 105 within a short stop time of the access processing of the volume #1.

The controller 101a copies the mapping table 501 representing the correspondence from the volume address to the storage area address for the volume #1 to the controller 101b. The controller 101a monitors the update of the mapping table 501 of the volume #1 while copying the mapping table 501 of the volume #1. Since the controller 101a copies the mapping table 501 of the volume #1 without stopping the access request designating the volume #1, the update of the entry (mapping) occurs when the controller 101a receives the write request during the copying and the data is written to the volume #1 in response to the write request. At this time, when the updated entry is an entry already copied to the controller 101b, the updated entry is not reflected in the controller 101b. Therefore, when the mapping table 501 being copied is updated, the controller 101a determines whether the updated entry is an entry already copied to the controller 101b. When the determination result is true, the controller 101a copies (transfers) the updated entry to the controller 101b. The controller 101b replaces the entry before update corresponding to the updated entry with the updated entry (that is, an entry in which a volume address that matches the volume address represented by the received updated entry is recorded is specified from all the received entries and replaces the entry (pre-update entry) with the updated entry).

As described above, in a storage system in which the controllers 101a and 101b share one or a plurality of storage media 103, in a state where access to the volume #1 is continued, the mapping table 501 of the volume #1 is copied from the controller 101a to the controller 101a, and thereafter, the controller 101a stops the access processing for the volume #1, and the controller 101b starts the access processing for the volume #1. Therefore, the stop time of the access processing of the volume #1 is reduced, and the timeout of the access request to the volume #1 can be prevented. Specifically, for example, the processing performed during the stop time of the access processing of the volume #1 is the handover of the control right from the controller 101a to the controller 101b and the changing of the access destination controller for the volume #1. Since these procedures do not depend on the capacity of the mapping table 501 of the volume #1, the stop time of the access processing of the volume #1 can be reduced regardless of the capacity of the volume #1, and thus, it is possible to prevent the timeout of the access request for the volume #1.

The controller 101a may copy the entries of the mapping table 501 to the controller 101b in the order of regularity regarding the volume address. When the storage area address is allocated to the volume address of the volume #1 in the controller 101a during copying of the mapping table 501, the controller 101a compares the write address, which is the volume address in the allocation, with the pointer address of the volume #1 (an example of the volume address represented by the entry of the next copy target), and determines whether the write address is the volume address represented by the copied entry on the basis of a result of the comparison. That is, it is possible to determine whether the entry in which the write address is recorded is the copied entry by comparing the write address and the pointer address. Since the comparison and determination based on the volume address (logical address) are realized as described above, the volume addresses of the exclusive control target and the copy target (retransfer target) can be quickly specified (without address conversion).

In the write processing, data writing may be data writing in a log structure including data compression. The storage area address allocated to the volume address specified from the write request may be the storage area address next to the tail storage area address among the storage area addresses allocated to any volume address. The size of the volume area (area in the volume #1) to which the volume address belongs may be a unit of writing. In the data writing in such a log structure, the capacity of the mapping table 501 of the volume #1 is large, but the stop time of the access processing to the volume #1 in the migration of the volume #1 does not depend on the capacity of the mapping table 501 of the volume #1. Therefore, even if data writing in the log structure is applied to the volume #1, the stop time of the access processing of the volume #1 can be reduced in the migration of the volume #1. According to the data writing in the log structure, data is written in a continuous area (an area indicated by a continuous storage area address) in the storage area provided from one storage medium 103 every time data is written in the volume.

Figure 13:
FIG. 13 is a part of a flowchart illustrating a flow of volume migration processing performed by a controller of a migration source in a modification of the first or second embodiment.
Figure 14:
FIG. 14 is a part of a flowchart illustrating a flow of volume migration processing performed by a controller of a migration source in a modification of the first or second embodiment.

In the write processing to which the data writing in the log structure is applied, when the volume address specified from the write request is a volume address to which the storage area address has been allocated, another storage area address is allocated to the volume address instead of the allocated storage area address, and the allocated storage area address becomes an invalid storage area address. Therefore, the controller 101a may perform garbage collection for releasing an invalid storage area address. The garbage collection includes allocating the allocated storage area address by allocating the released storage area address to the volume address instead of the allocated storage area address to the volume address. That is, in addition to the write processing according to the write request designating the volume #1, the garbage collection is also a factor of changing the correspondence relationship between the volume address and the storage area address. Therefore, in the first or second embodiment, the controller 101a continues to receive the write request designating the volume #1 from the start to the completion of the copy of the mapping table 501 of the volume #1 in the volume migration processing, but may stop the garbage collection for the volume #1 (for example, as illustrated in FIG. 13, the garbage collection may be prohibited when the volume migration processing is started, and as illustrated in FIG. 14, the garbage collection may be permitted after the copy of the mapping table 501 is completed). As a result, it is possible to reduce the frequency (in other words, the frequency at which retransferring of the entry occurs due to updating of the copied entry) at which the address correspondence relationship is changed during copying of the mapping table 501.

Note that the garbage collection may be performed when a predetermined event occurs, such as when the free space of the physical storage area becomes less than a predetermined value, or may be periodically performed. The garbage collection may be an example of background processing (processing in which allocation of a storage area address to a volume address is changed by migrating data between storage areas in a physical storage area regardless of whether a write request has been received) performed by the controller 101a. That is, the controller 101a may not perform background processing on the volume #1 during copying of the mapping table 501. Note that, as another example of the background processing, for example, in thin provisioning, in a case where there is a physical storage area configured by a plurality of tiers having different access performances (a plurality of storage area groups having different access performances) on the basis of a plurality of storage media having different access performances, there is processing of migrating data between the tiers, and allocating a storage area address of a storage area of a data migration destination instead of the storage area address to a volume address to which the storage area address of the storage area of the data migration source has been allocated.

In addition, when the storage system is a storage system of Hyper Converged Infrastructure (HCI), the host 105 may be realized in the controller 101 by executing an application program (or another program) in the controller 101. As the volume #1 is migrated from the controller 101a to the controller 101b, the host may also be shifted from the controller 101a to the controller 101b.

What is claimed is:

1. A distributed storage system, comprising:
   one or a plurality of physical storage devices; and
   a plurality of computers including first and second computers and connected to the one or plurality of physical storage devices, wherein
   the plurality of computers provide a volume that is a logical address space, and the volume is migratable between the plurality of computers,
   the one or plurality of physical storage devices provide a physical storage area that is a physical address space,
   the plurality of computers are configured to perform write processing based on a write request designating the volume, wherein the write processing includes:
     allocating a physical address not allocated to any logical address to a logical address specified from the write request, and
     writing data accompanying the write request to a physical storage area to which the allocated physical address belongs,
     the allocating of a physical address to a logical address includes writing an address correspondence relationship between the logical address and the physical address in metadata included in the first computer,
   the plurality of computers are configured to perform a migration while the write processing is being performed, wherein the migration includes:
     copying from the first computer the metadata to the second computer
     updating an acquisition address pointer corresponding to a progress of the copying step, wherein an acquisition address pointer is associated with a second logical address associated with the volume;
     determining whether an address correspondence relationship indicated by a copied metadata portion is changed in the first computer during copying of the metadata, by comparing the acquisition address pointer with the logical address specified from the write request;
     updating the metadata portion to a metadata portion indicating a changed address correspondence relationship, and copies the updated metadata portion to the second computer.

2. The distributed storage system according to claim 1, wherein
   the first computer copies a first portion of metadata indicating a correspondence relationship between a logical address and a physical address to the second computer in a pre-determined order regarding the logical address, and
   when allocation of a physical address to a logical address of the volume occurs in the first computer during copying of the first portion of metadata, the first computer compares a logical address in the allocation with the acquisition address pointer, and determines whether the logical address in the allocation is a logical address corresponding to the first portion of metadata based on a result of the comparison.

3. The distributed storage system according to claim 1, wherein
   in the write processing,
   the writing of data is writing of data in a log structure including compression of data,
   the physical address allocated to the logical address specified from the write request is a physical address next to a last physical address among the physical addresses allocated to any of the logical addresses in a pre-determined order, and
   the plurality of computers defines a unit of writing as a size of the volume area to which the logical address belongs.

4. The distributed storage system according to claim 3, wherein
   in the write processing, when the logical address specified from the write request is a logical address to which a physical address is allocated, another physical address is allocated to the logical address instead of the allocated physical address, and the allocated physical address becomes an invalid physical address,
   the first computer performs garbage collection for releasing an invalid physical address, and
   the garbage collection includes allocating a released physical address to the logical address instead of the physical address allocated to the logical address to fill the allocated physical address, and
   the first computer does not perform the garbage collection on the volume from when the copy of the metadata is started to when the copy of the metadata is completed.

5. The distributed storage system according to claim 1, wherein
   the first and second computers are connected to a host that issues a write request,
   the first computer has a control right for the volume, the control right being an authority to control the volume or access the volume, and
   after all of the metadata is copied to the second computer, the control right is transferred from the first computer to the second computer, and an access destination from the host to the volume is changed to the second computer.

6. The distributed storage system according to claim 1, wherein
   the first computer performs background processing in which allocation of a physical address to a logical address is changed by migrating data between storage areas in the physical storage area regardless of whether the write request is received, and
   the second computer does not perform the background processing on the volume from start to completion of copying of the metadata.

7. A volume migration method in a storage system that includes a plurality of computers including first and second computers and connected to one or plurality of physical storage devices, wherein
   the computer provides a volume that is a logical address space, and the volume is migratable between the computers,
   the one or plurality of physical storage devices provide a physical storage area that is a physical address space,
   the computer performs write processing based on a write request designating the volume, the write processing includes allocating a physical address not allocated to any logical address to a logical address specified from the write request, and writing data accompanying the write request to a physical storage area to which the allocated physical address belongs, and the allocating of a physical address to a logical address includes writing an address correspondence relationship between the logical address and the physical address in metadata included in the computer, the volume migration method, comprising:

in the migration of the volume from the first computer to the second computer, copying, by the first computer, the metadata to the second computer while receiving a write request designating the volume;

updating an acquisition address pointer corresponding to a progress of the copying step, wherein an acquisition address pointer is associated with a second logical address associated with the volume;

determining whether an address correspondence relationship indicated by a copied metadata portion is changed in the first computer during copying of the metadata, by comparing the acquisition address pointer with the logical address specified from the write request;

updating, by the first computer, the metadata portion to a metadata portion indicating a changed address correspondence relationship, and copying the updated metadata portion to the second computer.

* * * * *